S. P. MILLER.
PURIFICATION OF NAPHTHALENE.
APPLICATION FILED SEPT. 19, 1921.
1,438,710.
Patented Dec. 12, 1922.
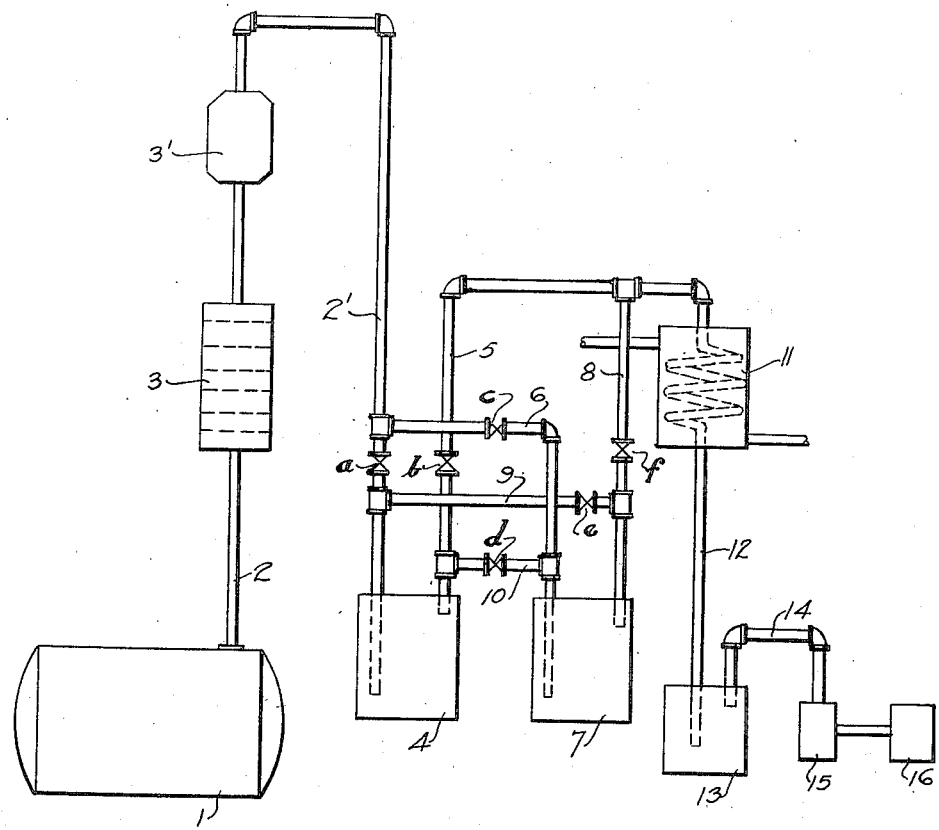

Patented Dec. 12, 1922.

1,438,710

UNITED STATES PATENT OFFICE.

STUART P. MILLER, OF PHILADELPHIA, PENNSYLVANIA, ASSIGNOR TO THE BARRETT COMPANY, A CORPORATION OF NEW JERSEY.

PURIFICATION OF NAPHTHALENE.

Application filed September 19, 1921. Serial No. 501,786.

*To all whom it may concern:*

Be it known that I, STUART P. MILLER, a citizen of the United States, residing at Philadelphia, in the county of Philadelphia and State of Pennsylvania, have invented certain new and useful Improvements in the Purification of Naphthalene, of which the following is a specification.

This invention relates to a process of purifying napthalene. Ordinarily crude naphthalene, by which is understood the product obtained by draining the crystals formed when naphthalene-bearing oil fractions are cooled, is purified in several steps, the first of which consists in the removal of excessive oil by means of a hydraulic press or a centrifugal machine. The "purified" naphthalene so obtained is washed with successive portions of sulfuric acid until unsaturated compounds, tar, etc., have been removed to a sufficient extent, the spent acids being discarded as of no value. Treatment with water, followed by neutralization, completes the washing operation. The resulting product is then distilled to give the refined naphthalene.

Crude naphthalene has a melting point of about 65°–72° C; the "purified" naphthalene has a melting point of about 77.5°–78.5° C; and the refined naphthalene has a melting point of about 79.6°–80° C.

I have discovered that the purification of crude naphthalene can be performed much more satisfactorily and with considerably greater ease and economy by employing the following method. Furthermore, the acid residues or sulfonic acids obtained by my process have considerable value, being useful in the arts as ingredients of synthetic tanning liquor, for saponification of oils, or for other well known uses to which crude sulfonic acids may be put.

In practicing this invention the crude naphthalene is placed in a still and distilled. The vapors are passed through a vessel or vessels of sulfuric acid of about 66° Bé. strength maintained at a temperature high enough to avoid condensation of the vapors. This temperature will usually be from about 134° C to about 144° C when the preferred pressure is used. The distillation may be performed at atmospheric pressure, or at any desired reduced pressure, or at pressures higher than atmospheric, and the time of contact between the vapors and sulfuric acid will be caused to be such that the impurities will be largely or completely sulfonated, while only a relatively small portion of the naphthalene vapors will be sulfonated, the remainder of the naphthalene vapors passing through in a highly purified state.

The invention will be understood from the description in connection with the accompanying drawing illustrating somewhat diagrammatically an arrangement of apparatus for carrying out the invention.

In the drawing, reference character 1 indicates a still which may be heated in any suitable and convenient manner. The outlet pipe 2 from the still 1 may lead through a fractionating column 3, provided with the desired number of plates and a deflegmator 3'. The pipe 2 is provided with a valve *a* and projects into an acid washer 4. An outlet pipe 5 provided with a valve *b*, leads from the acid washer 4 to the condenser 11. A pipe 6, provided with a valve *c*, leads from the pipe 2 to the acid washer 7. The pipe 8, provided with a valve *f*, leads from the washer 7 to the condenser 11. A pipe 9, provided with a valve *e*, connects pipes 2 and 8 as indicated, and a pipe 10, provided with a valve *d*, connects the pipes 5 and 6 as indicated.

An outlet pipe 12 leads from the condenser 11 to the receiver 13, which receiver is connected by pipe 14 with a vacuum pump 15 driven by a motor 16.

The operation is as follows:

Crude naphthalene is placed in the still 1 and, upon application of heat, the water vapors first pass over, which vapors can be by-passed through the pipe 9 without passing through the acid washers 4 or 7. After the water vapors have passed over, the naphthalene vapors, mixed with vapors of organic impurities ordinarily found in crude naphthalene, are caused to pass through the acid washers 4 and 7. When it is desired that the vapors pass through the acid washers 4 and 7 in parallel, the valves *d* and *e* are closed while the other valves are left open, and when it is desired that the vapors pass through the acid washers in series, the valves *b*, *c* and *e* are closed, while the other valves are left open. The actual quantity of sulphuric acid in the washers 4 and 7 will be regulated according to the quantity of naphthalene to be purified. I prefer to have an amount of sulphuric acid in each washer equal roughly to 10 percent by weight of the naphthalene to be purified. This figure may be departed from to any extent desired; if much less than 10 percent is used in each washer, it will be desirable to have more than 2 washers in series; and if much more than 10 percent, it will be desirable to leave the acid in the washers for a longer period, i. e., during the distillation of more than one still charge of naphthalene, in order that all free sulphuric acid may be used up. The acid in the washers should not be removed until it becomes evident that the degree of purification of the naphthalene begins to lessen. It is evident that no limit need be set as to the actual quantity of sulphuric acid present, as small amounts may be used with frequent replacement of fresh acid.

I am familiar with the fact that it is not new to sulphonate naphthalene continuously. My process of purification of naphthalene may also be carried out continuously. In this case the addition of sulphuric acid to the washers would be done continuously. A quantity of acid just sufficient to maintain the desired quality of the naphthalene distillate would be added continuously. The unsaturated bodies or more easily sulphonated organic compounds usually found mixed with crude naphthalene will be sulphonated, and since the sulphonic acids are non-volatile, the same will remain in the acid washers 4 and 7 while most of the naphthalene vapors themselves will pass through and be condensed and collected in the receiver 13.

It is not necessary to have the fractionating column 3 as the crude vapors from the still 1 may be passed directly into the acid washers, and it is not absolutely necessary to maintain a vacuum in the system, but it is usually preferred to do so. Especially where the formation of sulphones is undesirable, it is advisable to work at reduced pressures with correspondingly lower temperatures. A vacuum of about 26 to 28 inches of mercury has been found to give good results. Also, it has been found that the naphthalene vapors pass off from the acid washers more easily when a vacuum is maintained.

A greater or a smaller number of acid washers may be provided when desired, and the washers may be heated when necessary by means not shown. When the sulfuric acid in any of the washers has been converted into sulfonic acid to the extent desired the valves may be manipulated to cut out the washer for the purpose of removing the sulfonic acid and introducing a fresh supply of sulphuric acid.

As a specific example illustrating the invention, 10,000 pounds of crude naphthalene may be charged into the still 1 and the water present may be driven off by heating the still. The water vapor is passed through the by-pass 9 and valve *e*. As soon as the water has been removed or before the pressure throughout the system may be reduced by a vacuum pump and the temperature of the naphthalene may be increased until boiling begins. When a vacuum of 26 inches is maintained, this boiling point will be about 144° C. By properly manipulating the valves, the vapors from the still may be passed through the washers in series, these washers each containing about 1000 pounds of 66° Bé. sulfuric acid. The naphthalene vapors passing through and being condensed in the condenser 11 and finally flowing into the receiver 13, will be a high grade refined product having a melting point of 79.6°-80° C. When the sulfuric acid in the first washer has been converted into sulfonic acids, the sulfonic acids are removed and fresh sulfuric acid introduced. The valves may then be so manipulated that the other washer may be made the first one to receive the vapors from the still so that the fresh acid serves as a scrubber for the vapors just before they pass to the condenser.

I am familiar with the fact that it is not new to sulfonate hydrocarbons by passing their vapors into sulfuric acid. The present invention is for an improved process of purifying naphthalene, by which process the purification of the naphthalene is considerably simplified and the by-products obtained in this purification are valuable for use in the arts.

While mention has been made of the fact that a vacuum of about 26 to 28 inches has been found to give good results, and that the temperature to avoid condensation of the vapors will usually be about 134° C. to 144° C., it is to be understood that a lower vacuum and a correspondingly higher temperature could be used down to a vacuum of about 15 inches of mercury and a corresponding temperature of about 186° C.

I claim:

1. The process of refining naphthalene, which comprises the steps of distilling crude naphthalene and passing the vapors through sulfuric acid.

2. The process of refining naphthalene, which comprises the steps of distilling crude naphthalene and passing the vapors through sulfuric acid under reduced pressure.

3. The process of refining naphthalene, which comprises the steps of distilling crude naphthalene and passing the vapors through sulfuric acid under reduced pressure at about 134° C. to 144 ° C.

4. The process of refining naphthalene, which comprises the steps of distilling crude naphthalene, passing the vapors through sulfuric acid under reduced pressure, and subsequently substantially completely removing the unchanged naphthalene.

In testimony whereof I affix my signature.

STUART P. MILLER.